United States Patent [19]
Harrison

[11] Patent Number: 4,784,249
[45] Date of Patent: Nov. 15, 1988

[54] CLUTCH SERVOS

[75] Inventor: Anthony W. Harrison, Birmingham, England

[73] Assignee: Lucas Industries, Birmingham, England

[21] Appl. No.: 783,003

[22] Filed: Oct. 2, 1985

[30] Foreign Application Priority Data

Oct. 5, 1984 [GB] United Kingdom ............... 8425289
Apr. 27, 1985 [GB] United Kingdom ............... 8510777

[51] Int. Cl.$^4$ ............................................. F16D 19/00
[52] U.S. Cl. ............................ 192/85 V; 192/111 A; 92/99
[58] Field of Search ............... 91/376 R; 92/13, 13.1, 92/13.2, 99, 98 D; 60/547.1, 548; 188/196 R, 67, 196 P, 196 V; 192/85 V, 99 S, 111 A

[56] References Cited

U.S. PATENT DOCUMENTS

| | | | |
|---|---|---|---|
| 3,060,899 | 10/1962 | May et al. | 91/376 |
| 3,921,773 | 11/1975 | Dietrich | 192/83 |
| 4,114,743 | 9/1978 | Sink et al. | 192/91 R |
| 4,420,988 | 12/1983 | Deligny | 192/111 A |

FOREIGN PATENT DOCUMENTS

| | | |
|---|---|---|
| 0048620 | 9/1981 | European Pat. Off. . |
| 407112 | 10/1932 | United Kingdom . |
| 1550613 | 6/1975 | United Kingdom . |

Primary Examiner—Samuel Scott
Assistant Examiner—Noah Kamen
Attorney, Agent, or Firm—Harness, Dickey & Pierce

[57] ABSTRACT

A clutch servo for a vehicle cable-operated clutch system has a housing, an input member to which an input force is applied by the cable which has an inner cable and an outer sheath, an output member connected to a clutch, and a movable wall for augmenting the output force which acts through the output member. The movable wall is operated by a fluid pressure chamber, pressurization of which is controlled by a valve in response to the input force. In one construction the inner cable is movable relative to the movable wall and a locking device is incorporated to lock the inner cable and the movable wall against relative movement when the movable wall is not in its retracted position. This ensures that the servo is not affected by adjustment of the cable to compensate for clutch lining wear when this adjustment is performed between the servo and the pedal. In another construction the servo includes an adjuster mechanism in the form of a locking mechanism between the housing and an end of the sheath, which is inoperative when the inner cable is retracted to allow relative movement between the end and the housing, and which operates when the inner cable moves from its retracted position to lock the sheath and the housing against movement. A valve actuating mechanism in the form of a lever is also incorporated to transmit the input force from the cable to the valve operation of which is controlled by the input force and an opposing force in at least one spring.

13 Claims, 4 Drawing Sheets

CLUTCH SERVOS

BACKGROUND OF THE INVENTION

This invention relats to clutch servos for vehicle cable-operated clutch systems of the kind comprising a housing in which works an input member to which an input force from a pedal is applied by a cable assembly comprising a flexible inner cable and a flexible outer sheath, an output member for connection to the clutch, through which an output force acts, a movable wall for augmenting the output force, the movable wall being operated by pressurisation of a fluid pressure chamber, and valve means for controlling pressurisation of the chamber in response to the output force.

Clutch servos of the kind set forth may be vacuum-operated. In an operative position, both sides of the movable wall are connected to a vacuum source, and in operation the valve means admits air to the fluid pressure chamber to operate the movable wall. In a vehicle, the vacuum source for clutch operation tends to be uncertain, so it is necessary for the volume of the fluid pressure chamber to be kept to a minimum, in order to avoid, as far as possible, failure of the vacuum source. However, difficulties may arise if the system includes adjustment, whether automatic or manual, of the clutch cable assembly to compensate for clutch lining wear. If the adjustment, which increases the effective length of the inner cable, is performed between the pedal and the servo, the retracted position of the movable wall in the housing, and the volume of the fluid pressure chamber, alter accordingly. In fact, as the linings wear, the movable wall moves away from the pedal, so that the volume of the chamber is reduced, but then a larger volume is required when the clutch linings are new.

SUMMARY OF THE INVENTION

According to a first aspect of our invention, in a clutch servo of the kind set forth the inner cable is movable relative to the movable wall, and a locking means is incorporated to lock the inner cable and the movable wall against relative movement when the movable wall is not in its retracted position.

Thus, when the servo is inoperative the inner cable can move relative to the movable wall, so that adjustment of the cable does not affect the servo, while the locking means ensures that operation of the servo is unaffected. The volume of the fluid pressure chamber can therefore be kept to a minimum.

The locking means preferably comprises a sprag ring, but may comprise a ball and ramp mechanism. Conveniently, the movable wall is attached to the output member, and the inner cable is attached to the input member, which is slidable relative to the output member, with the locking means acting between the input and output members. The output member may comprise a tube, and the input member a sleeve slidable in the tube.

This arrangement solves the problem of compensating for operation of an automatic adjuster means when the servo is incorporated in an existing clutch system with the adjuster means between the pedal and the servo. However, if adjustment of the cable assembly is performed between the servo and the clutch there is no need to compensate for adjustment, and a second aspect of our invention is concerned with providing such adjustment.

According to a second aspect of our invention, in a vehicle cable-operated clutch system including a clutch servo of the kind set forth, the cable assembly includes a portion following an arcuate path, with an end of the sheath, between the servo and the clutch, and the housing being relatively movable, and the servo has adjustment means operative to adjust the effective length of the inner cable, the adjustment means comprising a locking means between the end of the sheath and the housing which is inoperative when the inner cable is in its retracted position to allow relative movement between the end of the sheath and the housing, and which operates when the inner cable moves from its retracted position to lock the sheath and the housing against movement.

The effective length of the inner cable is adjusted by altering the arcuate path, the shape of the path being determined by the sheath. When the clutch system is inoperative relative movement of the housing and the end of the sheath allows the inner cable to assume the appropriate path, but when the cable assembly is actuated the sheath and the housing are fixed to ensure proper actuation of the clutch. In one construction the housing is fixed and the arcuate portion of the cable assembly is between the servo and the clutch, so that the end of the sheath is movable relative to the inner cable and the housing when the clutch system is inoperative.

In an alternative construction the end of the sheath is fixed and the arcuate portion of the cable assembly is between the servo and the pedal, and the housing is mounted by flexible resilient mounts, so that when the clutch system is inoperative the housing and the inner cable can move relative to the end of the sheath. Both these constructions provide a simple adjusting means in the clutch servo.

The locking means preferably comprises a roller and ramp mechanism, which is operative to lock the housing and a sleeve connected to the end of the sheath when the cable is operated.

A third aspect of our invention concerns actuation of the valve means in a clutch servo of the kind set forth.

In a servo of the kind set forth the valve means is normally actuated by movement of the input member in response to the input force, and operation of the valve is controlled by comparing the input force with the output force from the servo, in order to ensure that the output force is proportional to the input force. In a brake servo it is of course necessary for the output force to be proportional to the input force at all times, but there may be problems in designing the valve means to ensure that this happens for low input forces, because of the lost-motion in the system. If a similar valve means is to be used in a clutch system, where the lost-motion tends to be greater, these problems are greater, and actuation of the valve means by movement of the input member may not be reliable. However, in a clutch system it is not essential for the output force to be proportional to the input force.

According to a third aspect of our invention a clutch servo of the kind set forth includes a valve actuating means to transmit the input force from the cable assembly to the valve means, operation of the valve means being controlled by the input force and an opposing force provided by means including a resilient means.

The valve means is operated only when the input force reaches a given value. This has the advantage that actuation of the valve means relies not on movement of the input member, but on the input force. The valve means may be controlled solely in response to the force in the resilient means, or by the reaction force from the valve means as well. In either case, operation of the valve means is controlled primarily by the force in the resilient means, which is substantially constant, rather than the variable output force. The design of the valve means is therefore less critical, and its construction can be simpler.

The resilient means may be provided in the actuating means, and/or in the valve means.

The valve actuating means may transmit the input force directly from the cable assembly to the valve means. Alternatively, the valve actuating means may comprise a lever means pivoted on the housing, having a point spaced from the pivot at which the cable assembly applies the input force, and a further point spaced from the pivot through which a reduced force is transmitted to the valve means.

Thus if the input force is too large to actuate the valve means directly, the lever means can be used to reduce it. Reduction of the valve actuating force also reduces the energy used by the valve means in performing the essential valve movement in operation. This energy is provided by movement of the cable under load, and results in a travel loss in the clutch system. Thus reducing the energy used in operating the valve means results in reduced travel loss, which is advantageous.

The lever means may have any suitable construction. For example, the lever means may comprise a single arm pivoted on the housing, with the cable assembly applying the input force through a further member rotatably fixed to the lever at the force-applying point. The resilient means may comprise a spring included in the actuation means, or in the valve means. Alternatively, a part of the housing may be adapted to act as the lever means and the resilient means. This is achieved by providing slots in the housing, which allows it to act as a spring-loaded lever when the cable assembly applies the input force to it.

BRIEF DESCRIPTION OF THE DRAWINGS

Some embodiments illustrating all aspects of the invention are shown in the accompanying drawings, of which.

DETAILED DESCRIPTION

Figure 1:
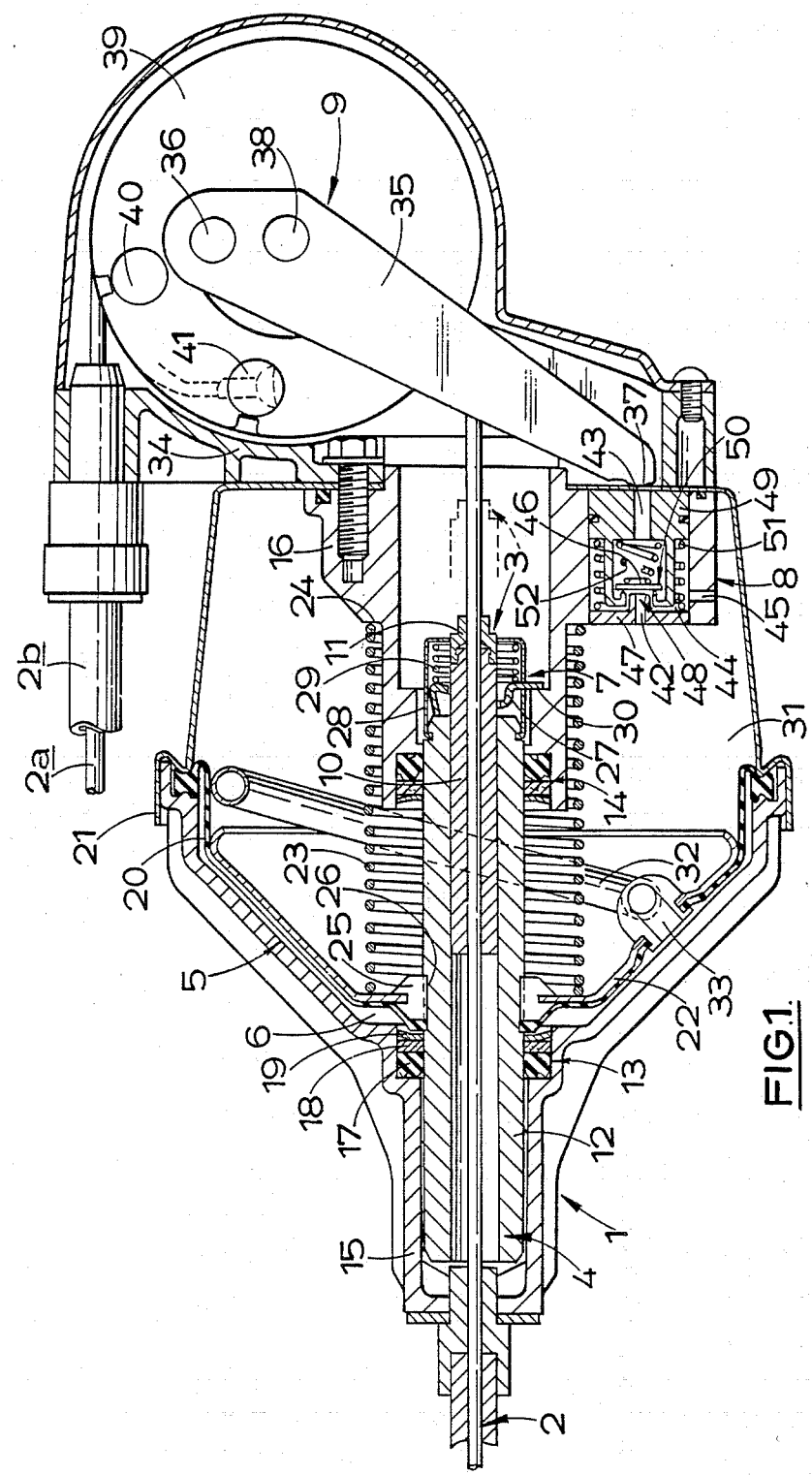
FIG. 1 is a longitudinal section through a clutch servo.

The clutch servo shown in FIG. 1 is vacuum-operated, and is for a vehicle cable-operated clutch system. The servo has a multi-part housing 1 through which the clutch cable assembly 2 extends. The cable assembly 2 is of conventional design having an inner cable 2a and an outer sheath 2b and is connected to a pedal (not shown) through an automatic adjusting mechanism (not shown). The servo has an input member 3 to which an input force from the pedal is applied through the cable assembly, and an output member 4 which applies an output force to a clutch (not shown) through the cable assembly 2. A movable wall 5 working in the housing 1 augments the output force, and is operated by pressurisation of a fluid pressure chamber 6. The inner cable 2a is movable relative to the movable wall 5, but a locking means 7 is incorporated to lock the inner cable 2a and the movable wall 5 when the movable wall is not in its retracted position. A valve means 8 controls pressurisation of the chamber 6 in response to the input force, and is actuated by valve actuating means 9 pivoted on the housing 1.

The input member 3 is in the form of a sleeve 10 secured to the inner cable by a metal crimping member 11. The sleeve 10 slides in the output member 4, which is in the form of a tube 12 working in the housing. The tube 12 slides in two similar seal assemblies 13, 14, one on each side of the movable wall 5, the assembly 13 being located in a forward housing part 15, and the assembly 14 in an intermediate housing part 16. Each seal assembly 13, 14 comprises a rubber sealing ring 17 backed by a ring 18, of felt-like material, which absorbs lubricant, and a retaining ring 19 to retain the seal assembly in the housing. This type of seal assembly ensures good lubrication of the sliding surfaces, while requiring no maintenance.

The output member 4 is connected to the movable wall 5, which comprises a rubber diaphragm 20 clamped between the forward housing part 15 and the adjacent housing part 21. The diaphragm 20 is secured to a piston 22, and a spring 23 works between the piston 22 and an abutment 24 in housing part 16 to bias the movable wall 5 into the retracted position shown. The piston 22 is secured to the output tube 12 by a sleeve 25 of aluminum alloy. The sleeve 25 is initially of rectangular section, but is extruded round the edge of the piston 22 and into grooves 26 in the outer edge of the tube 12 by a suitable tool. The sleeve 25 provides an easy method of fixing the piston 22 to the tube 12 which ensures that the piston and tube are concentric.

The locking means 7, which locks the inner cable and the movable wall 5 against relative movement, acts between the output tube 12 and the input sleeve 10. The locking means 7 comprises a sprag ring 27 located in a cage 28 clipped onto the rearward end of the tube 12, and biassed by a spring 29 to lock the tube 12 and sleeve 10 against relative movement. With the movable wall 5 in the retracted position shown, the sprag ring 27 engages an abutment 30 in the housing part 16, which moves it out of engagement with the sleeve 10, allowing the input sleeve and the inner cable to move relative to the output tube 12 and the movable wall 5. On movement of the movable wall 5 and tube 12, the sprag ring 27 moves away from the abutment 30, and locks the tube and sleeve together.

The movable wall 5 has the fluid pressure chamber 6 on one side of the diaphragm 20, and on the opposite side is a chamber 31 permanently connected to a vacuum source (not shown). The valve means 8 controls pressurisation of the chamber 6 by connecting it either to the vacuum source through chamber 31 or to atmospheric pressure. The valve means 8 has a port 42 connected to the vacuum chamber 31, a port 43 connected to atmosphere, and a control pressure space 44, connected to the chamber 6 by a port 45, a flexible tube 32 (only part of which is shown) and the connection 33 securing the piston 22 to the diaphragm 20. A valve member 46 co-operates with a first fixed seat 47 to form a first valve 48 controlling communication between the control space and the vacuum source. The valve member 46 also co-operates with a second movable seat 49, on which the actuating means 9 acts to form a second valve 50 controlling communication between the control space and atmosphere. A first valve spring 51 acts between the first and second seats 47, 49 to bias the first valve 48 into the open position, while a second valve spring 52 acts between the valve member 46 and the second seat 49 to bias the second valve into the closed position. Normally, the first (exhaust) valve 48 is open and the second (inlet) valve 50 is closed, so that the chamber 6 is connected to vacuum, but on actuation of the valve means the first valve is closed and the second valve opened to pressurise the chamber 6.

The valve means 8 is actuated by the valve actuating means 9 in the form of lever means mounted on the rearward housing part 34. The lever means comprises a single lever arm 35 pivoted on the housing 34 at a point 36 adjacent one end. At the other end a point 37 on the lever 35 acts on the valve means 8. At an intermediate point 38 on the lever, the cable 2a applies a force to the lever 35 by means of a pulley 39 mounted for rotation at the point 38. The pulley 39 is not connected to the housing 1. The cable 2 may run continuously round the pulley 39, but in this embodiment it is in two parts, which makes replacement easier. A first part connected to the pedal runs all the way round the pulley 39, and is fastened to it at 40. A second part, which is connected to the clutch, runs approximately three-quarters of the way round the pulley 39, and is fastened at 41. When the clutch is operated, a tension force builds up in the inner cable 2a, and the pulley 39 applies a force to the lever 35 at the point 38 equal to twice the force in the cable. This causes the lever 35 to pivot about the fixed pivot 36, so that an actuating force is applied to the valve means 8 at the point 37.

Normally, the servo is in its retracted position shown, with the chambers 6 and 31 connected to the vacuum source. When a load is applied to the clutch pedal any lost motion in the system is first taken up, and then a tension force builds up in the inner cable 2a. This will start to move the inner cable and the input member 3 towards the pedal, but the outut member 4 and the movable wall 5 will not move, as the sprag ring 27 is disengaged. The tension force in the cable 2 also acts on the lever 35 through the pulley 39, and when this input force reaches a given value, the valve actuating force applied by the lever 34 overcomes the force in the spring 51 to actuate the valve means 8. Operation of the valve means 8 first closes the valve 48 to cut off chamber 6 from the vacuum source, and then opens the valve 50 against the force in the spring 52 to allow air into the chamber 6, moving the movable wall 5 against the force in the spring 23. The output member 12 moves with the wall 5, and the sprag ring 27 locks the input and output members, and thus the inner cable and the movable wall 5, together. During this movement to disengage the clutch, the tension force in the cable is balanced by the force in the valve springs, and when the clutch is fully disengaged, the various forces act to close the valve 50, isolating the chamber 6 from the air supply. The servo is then in its balanced position.

When the load on the pedal is removed, the tension force in the inner cable decreases. This results in a decrease in the force applied to the lever 35 by the pulley 39, and thus in the valve actuating force, which enables the first valve spring 51 to open the first valve 48 again, connecting the chamber 6 to vacuum. The movable wall 5 can then return to its retracted position, under the influence of spring 23, and the cable 2 returns with the movable wall 5, as the sprag ring 27 is still engaged. During this return stroke the tension force in the inner cable is balanced by the force in the first valve spring 51 only, as the second valve 50 remains closed. The sprag ring 27 disengages when the movable wall 5 reaches its fully retracted position, and the inner cable is again free to move relative to the movable wall 5. Thus, adjustment of the inner cable, which normally takes place when the clutch is engaged, does not affect the servo. As the clutch linings wear the inner cable is lengthened, and the input member 3 moves relative to the output member 4. In this case, since adjustment takes place between the servo and the pedal, the input member moves relatively towards the output member. The position of the input member 3 shown in FIG. 1 is in fact one in which the linings are fully worn. The position of the input member 3 when the clutch linings are new is shown in dotted lines.

The provision of the locking means 7 means that automatic adjustment of the cable 2 can be provided without affecting the servo, and in particular, without altering the volume of the chamber 6.

In a modification (not shown) the locking means 7 comprises a ball and ramp mechanism.

Figure 2:
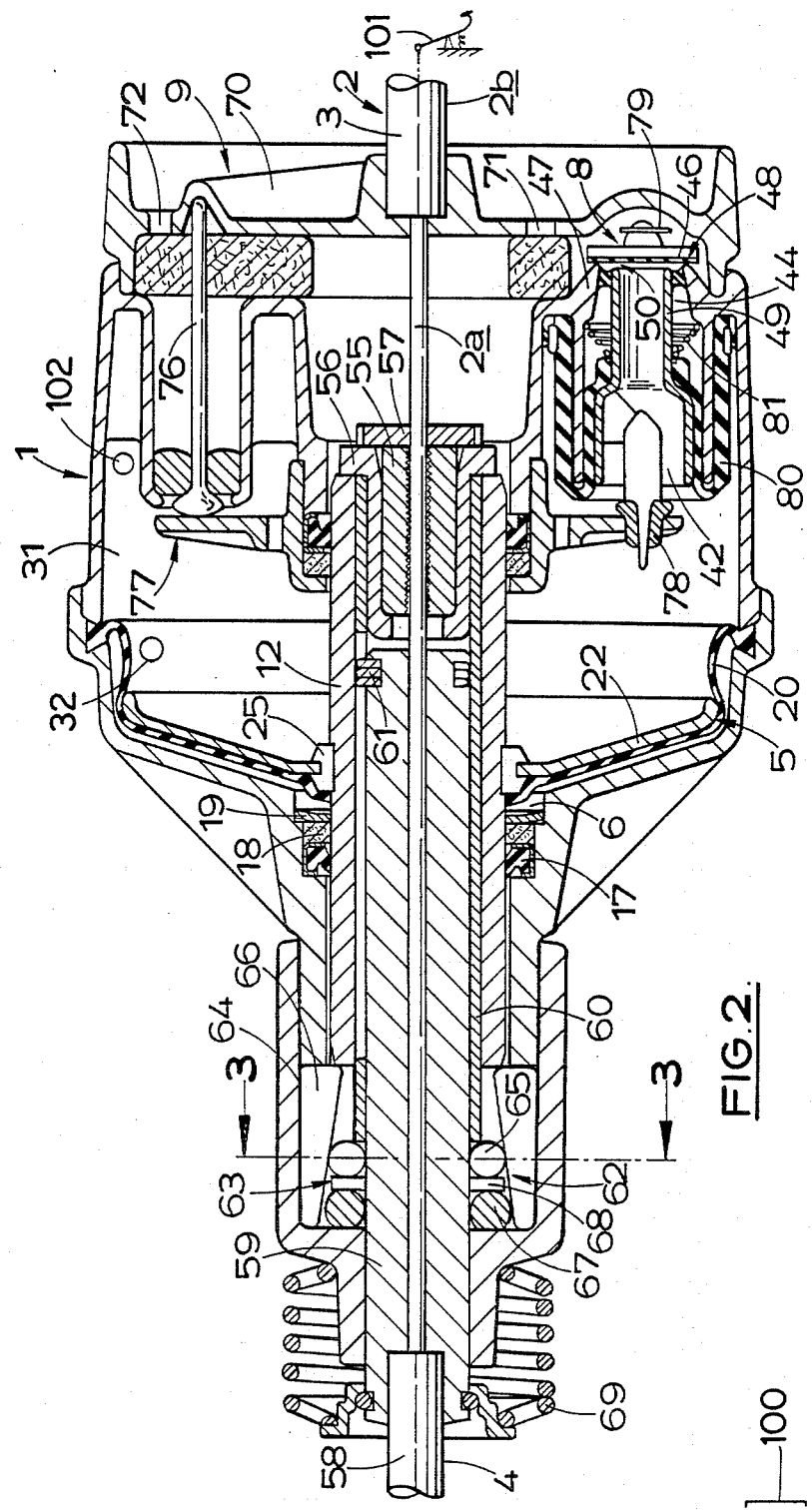
FIG. 2 is a longitudinal section through a further clutch servo.
Figure 5:
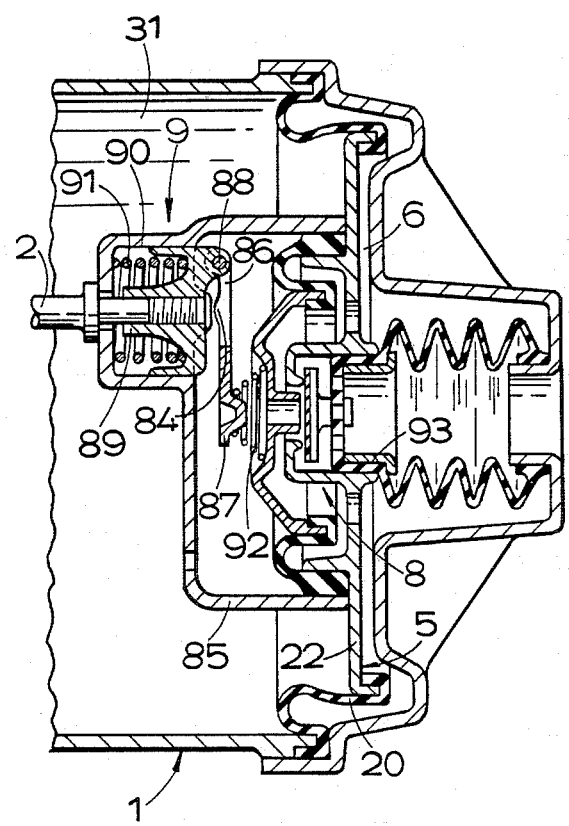
FIG. 5 is a longitudinal section through a further clutch servo showing the actuating means and valve means.

The operation of the valve means 8 in response to an input force and an opposing force provided by resilient means results in reliable valve operation. In FIG. 1 the resilient means are the valve springs, but additional or alternative resilient means may be provided in the valve actuating means. In a modification (not shown) a blade spring mounted on the pulley 39 could by used to bias the lever arm 35 against the input force. FIGS. 2 and 5 show other ways of arranging the resilient means in the valve actuating means.

Figure 3:
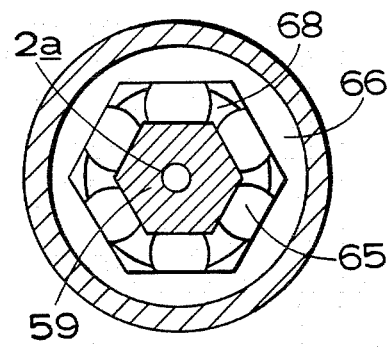
FIG. 3 is a section on the line 3—3 of FIG. 2.
Figure 4:
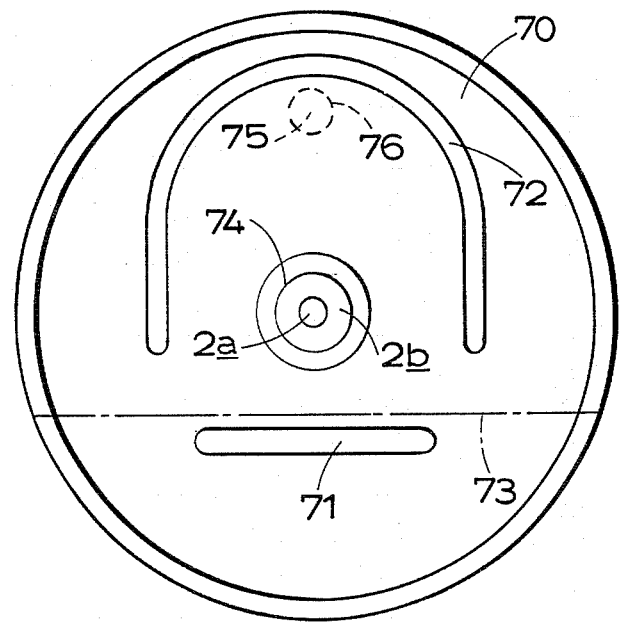
FIG. 4 is an end view of the servo of FIG. 2.

The clutch servo shown in FIGS. 2 to 4 also has a different adjustment means. Corresponding reference numerals have been applied to corresponding parts where appropriate.

In FIG. 2 the cable assembly 2 includes a portion between the servo and the clutch 100 which follows an arcuate path. The inner cable 2a runs unbroken from the pedal 101 to the clutch, and has a tube 55 swaged onto it. Abutmentmembers 56, 57 are attached to the tube 55, so that force from the movable wall 5 is applied to the inner cable through tube 12 and abutment member 56. The sheath 2b is fixed to the housing 1 at the input end, but between the servo and the clutch the sheath has an end 58 which is movable relative to the housing. The end 58 is connected to a hexagonal tube 59 which slides in the housing, and in a slotted sleeve 60 which in turn slides in the tube 12. A spring pin 61 of c-outline is located in the slotted part of the sleeve 60 guide the hexagonal tube 59 in the tube 12. The servo includes adjuster means to adjust the position of the end 58 of the sheath in order to adjust the effective length of the inner cable. The adjuster means comprises locking means 62 in the form of a roller and ramp mechanism 63, which is located in a recess 64 in the housing. The mechanism 63 has rollers 65 which co-operate with the tube 59 and a ramp 66, and a rubber buffer 67 which acts on the rollers through a ring 68. In the inoperative position shown the inner cable in its retracted position acts through members 55, 56, 57 to urge the sleeve 60 towards the rollers 65, keeping the rollers out of engagement with the tube 59 and compressing the buffer 67. In this position the tube 59 can move relative to the housing and the inner cable. However, when the inner cable moves during clutch actuation, the members 55, 56, 57 move with it, removing the retracting force from the sleeve 60. The buffer 67 can then expand, urging the sleeve 60 to move in the same direction as the cable, and the rollers 65 down the ramp 66 and into engagement with the tube 59 to lock it against movement relative to the housing. A large, low-rate spring 69 acts between the housing and the tube 59. This serves as a return spring for the movable wall 5, and also loads the clutch withdrawal bearing (not shown) in the actuating direction, which prolongs its life. As with FIG. 1, the tube 59 is shown in the position where the clutch linings are fully worn, the tube 59 moving towards the pedal as the linings wear, which shortens the sheath, but effectively lengthens the inner cable.

In FIG. 2 the valve actuating means 9 comprise a combined lever means and resilient means. This is achieved by arranging the housing cover 70 to act as a spring-loaded lever. As shown in FIG. 4, the cover 70 is provided with slots 71, 72 so that a pivot line is formed at 73. The input force is applied by the sheath at 74, while at the point 75 the force is transmitted to the valve means. The force is transmitted to the valve means through push-rod 76, and through a similar spring-loaded lever 77 formed by another portion of the housing, and to the second valve seat 49 through a rubber mount 78. The valve means 8 is also modified, with the valve member 46 mounted on the housing by a blade spring 79 and the springs 51 and 52 are omitted. The first valve 48 is the normally closed inlet valve, while the second valve 50 is the normally open exhaust valve. The second valve seat 49 is mounted in the housing by a rolling diaphragm 80 and is biassed away from the valve member 46 by a light spring 81. A port 102 connects the chamber 31 to the vacuum source and slots 71, 71 connect it to atmosphere.

The operation of FIG. 2 is in essence similar to that of FIG. 1. When a load is applied to the pedal the tension force builds up in the inner cable, which starts to move towards the pedal. This movement allows the locking means to operate, as described above, to lock the end 58 of the sheath to the housing. The tension force in the inner cable results in the usual reaction force in the sheath, which acts on the housing cover lever 70, and when this force reaches a given value at which the resilience of the lever 70 is overcome, the lever operates through the push-rod 76, lever 77 and mount 78 to start actuation of the valve means 8. Movement of the second valve seat 49 first closes the exhaust valve, and then lifts the valve member 46 clear of seat 47 to open the inlet valve to pressurise chamber 6. This operates the movable wall 5, which acts on the inner cable through the sleeve 12 and abutment member 56 to augment the pedal force. However, pressure in the chamber 6 also acts over the second valve seat 49, because of the diaphragm 80. This produces a reaction force, which is transmitted back through the rubber mount 78 and the levers to the sheath, and which also acts to move the second valve seat 49 and thus the valve member 46 back towards their original positions, in order to balance the inlet valve. When the input load is removed, the parts move back to their retracted positions, and adjustment of the effective length of the inner cable then takes place, if necessary, by movement of the tube 59.

It will be noted that in FIG. 2 operation of the valve means is controlled by the input force and an opposing force provided by the resilience of the lever means 70 and the reaction from the valve seat 49. The embodiment of FIG. 2 therefore provides a simple valve actuating means, as well as a simple adjuster mechanism for the clutch system.

A modification of the servo of FIG. 2 may be used where the arcuate portion of the cable assembly is between the servo and the pedal. In this case the end 58 of the sheath is fixed and the housing is carried by flexible resilient mounts, which allow it to move relative to the end 58, thus adjusting the position of the input end of the sheath. The operation of the modified servo is the same as that of FIG. 2, with the locking means 62 operating on initial movement of the cable 2a to lock the housing against movement, and adjustment of the effective length of the inner cable taking place when the clutch system is inoperative, by movement of the housing.

FIG. 5 shows another valve actuating means 9 for a clutch servo, and corresponding reference numerals have been applied to corresponding parts. Here the valve means 8 and the actuating means 9 are mounted on the movable wall 5, with the valve means 8 mounted on the piston 22 and the actuating means on a piston extension 85. The actuating means comprises a lever means in the form of a single forked lever arm 86 pivoted on the extension 85 at an intermediate point 84 in its length. At one end 87 the lever arm 86 acts on the valve means, while at the other forked end there is a pivotal connection 88 to a member 89 working in a recess 90 in the extension 85, and to which the inner cable is connected. A caged spring 91 works between the extension 85 and the member 89. The valve means 8 is similar to that shown in FIG. 2, except that the rubber mount 78 is replaced by a spring 92, and the valve member 46 is carried by a resilient rubber mount 93 rather than a blade spring.

In operation the tension force in the inner cable acts on the member 89, and when the force overcomes the load in the caged spring 91 the forked end of the lever arm 86 is moved towards the pedal, applying the valve actuating force to the valve means. Again, the valve means 8 is operated in response to the input force and an opposing force provided by the spring 91 and the reaction from the valve seat 49.

I claim:

1. A vehicle clutch system comprising a pedal, a clutch, a cable assembly comprising a flexible inner cable component and a flexible outer sheath component, said cable assembly connecting said pedal with said clutch for operating said clutch, and a clutch servo acting upon said cable assembly for augmenting the force applied to said pedal, said cable assembly including a portion following an arcuate path, said clutch servo comprising a fixed housing having an inlet for connection to a source of pressure and an outlet for connection to exhaust, an input member in said housing to which an input force from said pedal is applied by said cable assembly, an output member for applying an output force to said clutch, and means for augmenting said output force comprising a movable wall, means defining a fluid pressure chamber in said housing, pressurisation of said chamber operating said movable wall, and valve means for controlling pressurisation of said chamber, said valve means beng operative, in response to said input force, to control communication of said chamber with said inlet and said outlet, wherein adjustment means for adjusting the effective length of said flexible cable component are incorporated in said servo housing to compensate for wear within said clutch without changing the effective stroke of said movable wall, said adjustment means comprising means connecting one of said cable assembly components with one of said housing and said wall for relative movement, and locking means for locking said cable assembly component and the one of said housing and said wall against said relative movement when said inner cable component moves from a retracted position.

2. A vehicle clutch system as set forth in claim 1 wherein the adjustment means connects the inner cable component of the cable assembly with the movable wall and the locking means locks the inner cable component against relative movement to the movable wall.

3. A clutch servo as claimed in claim 2, wherein said movable wall is attached to said output member, and said inner cable is attached to said input member, said input member being slidable relative to said output member, with said locking means acting between said input and output members.

4. A clutch servo as claimed in claim 3, wherein said output member comprises a tube, and said input member a sleeve slidable in said tube.

5. A clutch servo as claimed in claim 2, wherein said locking means comprises a sprag ring.

6. A vehicle clutch system as set forth in claim 1 wherein the adjustment means connects one end of the sheath component of the cable assembly with the housing and the locking means locks the sheath component end against relative movement to the housing.

7. A clutch servo as claimed in any of claim 6, wherein said locking means comprises a ball and ramp mechanism.

8. A vehicle clutch system as claimed in claim 6, wherein said housing is fixed in said vehicle, and said arcuate portion of said cable assembly is between said servo and said clutch, so that said end of said sheath is movable relative to said inner cable and said housing when said clutch system is operative.

9. A vehicle clutch system as claimed in claim 6, wherein said end of said sheath is fixed and said arcuate portion of said cable assembly is between said pedal and said servo, and said servo housing is mounted by flexible resilient mounts so that said housing and said inner cable are movable relative to said end of said sheath when said clutch system is inoperative.

10. A vehicle clutch system as claimed in claim 6 wherein a tube is connected to said end of said sheath, and said locking means comprises a roller and ramp mechanism, operative to lock said housing and said tube when said system is operated.

11. A clutch servo for a vehicle clutch system operated by a cable assembly comprising a flexible inner cable and a flexible outer sheath, said servo comprising a housing having an inlet for connection to a source of pressure and an outlet for connection to exhaust, and in which works an input member to which a pedal-generated input force is applied by said cable assembly, an output force for applying an output force to a clutch by said cable assembly and a movable wall for augmenting said output force, means defining a fluid-pressure chamber in said housing, pressurization of said chamber operating said movable wall, valve means for controlling pressurization of said chamber, said valve means being operative in response to said input force to control communication of said chamber with said inlet and said outlet, and valve actuating means for transmitting said input force from said cable assembly to said valve means, said valve actuating means being formed as part of said housing and comprising resilient means, and lever means having pivot means, a point spaced from said pivot means at which said cable assembly applies said input force, and a further point spaced from said pivot means through which a reduced force is transmitted to said valve means, operation of said valve means being controlled by said input force and an opposing force provided at least in part by said resilient means.

12. A clutch servo as claimed in claim 11, wherein said opposing force is provided partly by a reaction force from said valve means.

13. A clutch servo as claimed in claim 11, wherein said part of said housing comprises an end cover provided with slots, said slots comprising means enabling said cover to act as a spring-loaded lever to which said cable assembly applies said input force.

* * * * *